(12) United States Patent
Sawanobori et al.

(10) Patent No.: US 7,942,592 B2
(45) Date of Patent: May 17, 2011

(54) CAMERA DIAPHRAGM DEVICE

(75) Inventors: Koji Sawanobori, Nerima-ku (JP);
Toshihiro Nishimura, Kita-ku (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 12/659,113

(22) Filed: Feb. 25, 2010

(65) Prior Publication Data

US 2010/0220993 A1 Sep. 2, 2010

(30) Foreign Application Priority Data

Feb. 27, 2009 (JP) .................................. 2009-047099

(51) Int. Cl.
*G03B 9/02* (2006.01)
(52) U.S. Cl. ....................................................... 396/510
(58) Field of Classification Search ........... 396/505–510
See application file for complete search history.

(56) References Cited

U.S. PATENT DOCUMENTS

| 5,293,542 | A | * | 3/1994 | Ise et al. .......................... | 348/363 |
| 5,687,417 | A | * | 11/1997 | Furlani et al. .................. | 396/449 |
| 5,749,015 | A | * | 5/1998 | Sato et al. ...................... | 396/508 |

FOREIGN PATENT DOCUMENTS

| JP | 10-221740 | 8/1998 |
| JP | 2002-162666 | 6/2002 |

* cited by examiner

*Primary Examiner* — W. B. Perkey
*Assistant Examiner* — Dennis Hancock
(74) *Attorney, Agent, or Firm* — Wenderoth, Lind & Ponack, L.L.P.

(57) ABSTRACT

A camera diaphragm device in which two diaphragm blades, that is, first and second diaphragm blades having respective first and second diaphragm aperture portions whose diameters differ from each other is provided. The diaphragm blades are mounted to blade mounting shafts provided close to each other and in a standing manner, and are separately reciprocatingly rotated by driving pins of respective rotors. When the diaphragm device is set in a minimum diaphragm aperture control state, not only is the first diaphragm blade having the first aperture portion for restricting the minimum diaphragm aperture moved to an aperture portion, but also the second diaphragm blade having the second aperture portion for restricting an intermediate diaphragm aperture is moved to the aperture portion from the same direction. An area of the aperture portion that cannot be covered by only the first diaphragm blade is covered by the second diaphragm blade.

11 Claims, 5 Drawing Sheets

CAMERA DIAPHRAGM DEVICE

BACKGROUND OF THE INVENTION

1. Field of the Invention

The present invention relates to a camera diaphragm device in which two diaphragm blades, having diaphragm aperture portions whose diameters differ from each other, are moved to and away from an exposure aperture portion by reciprocatingly rotating the two diaphragm blades by respective driving means.

2. Description of the Related Art

Widespread use of digital cameras has caused more and more recent camera diaphragm devices to be capable of controlling the size of a shooting optical path (diaphragm aperture) in two stages by causing diaphragm blades, having circular diaphragm aperture portions, to move to and away from an exposure aperture portion, which restricts a maximum diaphragm aperture, by driving means such as a motor. However, since the two-stage control operation is not a satisfactory control operation, a camera diaphragm device that can control the size of the shooting optical path in three stages by causing a second diaphragm blade, having a diaphragm aperture portion whose diameter is different from that of the aforementioned diaphragm blades, to move to and away from the exposure aperture portion by second driving means is discussed in Japanese Unexamined Patent Application Publication No. 10-221740 (Patent Document 1).

For the camera diaphragm device discussed in Patent Document 1, when the two diaphragm blades are moved away from the exposure aperture portion, they are accommodated in different areas of a base plate surface. For this reason, in this structure, the area required for accommodating the two diaphragm blades is large, thereby making it very difficult to reduce the size of the base plate, that is, to reduce the size of the device. To overcome this problem, when the two diaphragm blades are moved away from the exposure aperture portion, the two diaphragm blades are accommodated in substantially the same area of the base plate surface, and are configured to move to the exposure aperture portion from substantially the same direction.

Recent digital cameras are becoming very small and come in many designs. Therefore, even in diaphragm devices, the shape of the base plate is considerably restricted, and, for example, the mounting position and the structure of a motor serving as driving means mounted to the base plate are also considerably restricted. Therefore, even if the two diaphragm blades are formed so as to be accommodated in substantially the same area of the base plate surface as mentioned above, it may be necessary to dispose the two diaphragm blades by bringing the mounting positions of the two diaphragm blades with respect to the base plate close to each other.

Even in such a structure, the base plate is required to be smaller. If an attempt is made to reduce the size of the base plate, one of the diaphragm blades may be formed into a shape that does not allow it perform its function by itself. Therefore, even in such a case, a structure that can compensate for this is expected to appear. In addition, the two diaphragm blades are formed so that that they rotate individually at the areas that are close to each other by the respective driving means. Therefore, due to the shapes and mounting positions of the diaphragm blades, in terms of operation, it is necessary to form the diaphragm blades so that one diaphragm blade does not interfere with the driving pin of the other diaphragm blade. Further, when only one of the diaphragm blades is operated, it is easy to determine whether a malfunction has occurred. However, when both of the diaphragm blades are operated, it is difficult to determine whether a malfunction has occurred.

SUMMARY OF THE INVENTION

Accordingly, in order to overcome such a problem, it is an object of the present invention to provide a camera diaphragm device in which two diaphragm blades having diaphragm aperture portions whose diameters differ from each other are brought close to each other and mounted to a base plate, and move to and away from an exposure aperture portion from substantially the same direction by respective driving means. The camera diaphragm device is such that, even if one of the diaphragm blades is formed with a shape that does not allow it to perform its function by itself due to restrictions placed upon the diaphragm blade as a result of the shape of the base plate, the other diaphragm blade compensates for this, to make it possible to reduce the size of the camera diaphragm device. It is another object of the present invention to provide such a camera diaphragm device in which the two diaphragm blades can be properly mounted to the base plate without each of the two diaphragm blades interfering with the driving pin of the driving means of each of the other diaphragm blades in terms of operation. It is still another object of the present invention to provide such a camera diaphragm device that can easily determine that a malfunction has occurred.

To this end, there is provided a camera diaphragm device including a base plate, an auxiliary plate, a first diaphragm blade, and a second diaphragm blade. The base plate has an aperture portion in which an optical axis serves as center. The auxiliary plate has an aperture portion in which an optical axis serves as center. A blade chamber is formed between the auxiliary plate and the base plate. Either the aperture portion of the auxiliary plate or the aperture portion of the base plate serves as an exposure aperture portion that restricts a maximum diaphragm aperture. The first diaphragm blade has a diaphragm aperture portion which restricts a minimum diaphragm aperture. The first diaphragm blade is mounted to the base plate so that, by a driving pin of first driving means, the first diaphragm blade is reciprocatingly rotated to move to and away from the exposure aperture portion. The first diaphragm blade has a shape that causes an incapable-of-covering area to exist in addition to an area of the diaphragm aperture portion of the first diaphragm blade when the first diaphragm blade is moved to the exposure aperture portion. The incapable-of-covering area is where a portion of the exposure aperture portion is incapable of being covered. The second diaphragm blade has a diaphragm aperture portion which restricts an intermediate diaphragm aperture. The second diaphragm blade is mounted to the base plate at a position near where the first diaphragm blade is mounted so that, by a driving pin of second driving means, the second diaphragm blade is reciprocatingly rotated to move to and away from the exposure aperture portion from substantially a same direction as the first diaphragm blade. The second diaphragm blade has a shape causing the second diaphragm blade to cover a whole area of the exposure aperture portion, differing from an area of the diaphragm aperture portion of the second diaphragm blade, when the second diaphragm blade is moved to the exposure aperture portion. In the camera diaphragm device, when the first diaphragm blade is moved to the exposure aperture portion, the second diaphragm blade is also moved to the exposure aperture portion, so that the second diaphragm blade covers the incapable-of-covering area. In this case, when the second diaphragm blade has a relief hole, and the driving pin of the first driving means exists in the relief hole, a suitable structure is provided.

The camera diaphragm device according to the present invention may be such that the first diaphragm blade and the second diaphragm blade each have an engaging portion; such that, when the second diaphragm blade is in a moved away state from the exposure aperture portion, the engaging portion of the first diaphragm blade contacts the engaging portion of the second diaphragm blade to prevent the first diaphragm blade from moving to the exposure aperture portion; and such that, when the first diaphragm blade is moved to the exposure aperture portion, the engaging portion of the second diaphragm blade contacts the engaging portion of the first diaphragm blade to prevent the second diaphragm blade from moving away from the exposure aperture portion. In this case, it becomes easy to determine whether a malfunction has occurred when the first diaphragm blade and the second diaphragm blade both move to the exposure aperture portion and when they move away from the exposure aperture portion.

Further, the camera diaphragm device according to the present invention may be such that the second diaphragm blade has a first engaging portion, which corresponds to a portion of an edge of the relief hole, and a second engaging portion, which corresponds to another portion of the edge; such that the first diaphragm blade has an engaging portion existing in the relief hole; such that, when the second diaphragm blade is in a moved away state from the exposure aperture portion, the first engaging portion of the second diaphragm blade contacts the engaging portion of the first diaphragm blade to prevent the first diaphragm blade from moving to the exposure aperture portion; and such that, when the first diaphragm blade is moved to the exposure aperture portion, the second engaging portion contacts the engaging portion of the first diaphragm blade to prevent the second diaphragm blade from moving away from the exposure aperture portion. Even in this case, it becomes easy to determine whether a malfunction has occurred when the first diaphragm blade and the second diaphragm blade both move to the exposure aperture portion and when they move away from the exposure aperture portion.

Further, the camera diaphragm device according to the present invention may be such that the second diaphragm blade has a first engaging portion, which corresponds to a portion of an edge of the relief hole, and a second engaging portion, which corresponds to another portion of the edge; such that, when the second diaphragm blade is in a moved away state from the exposure aperture portion, the driving pin of the first driving means contacts the first engaging portion to prevent the first diaphragm blade from moving to the exposure aperture portion; and such that, when the first diaphragm blade is moved to the exposure aperture portion, the second engaging portion contacts the driving pin of the first driving means to prevent the second diaphragm blade from moving away from the exposure aperture portion. In this case, there is provided an optimal structure for making it possible to determine whether a malfunction has occurred when the first diaphragm blade and the second diaphragm blade both move to the exposure aperture portion and when they move away from the exposure aperture portion.

Further, the camera diaphragm device according to the present invention may be such that at least one of the first diaphragm blade and the second diaphragm blade has an ND filter sheet mounted thereto so as to cover the diaphragm aperture portion thereof.

In the camera diaphragm device according to the present invention, not only is the first diaphragm blade for minimum diaphragm aperture control and the second diaphragm blade for intermediate aperture control brought close to each other and mounted to the base plate, and individually move to and away from the exposure aperture portion from substantially the same direction by the respective first and second driving means, but also the second diaphragm blade covers the area of the exposure aperture portion (which could actually be covered but can no longer be covered because the size of the shape of the first diaphragm blade is smaller that that of an actually required shape) even if the size of the shape of the first diaphragm blade is made smaller than that of the actually required shape. In this case, if the second diaphragm blade has a relief hole, and the driving pin of the first driving means operates in the relief hole, the shape and the mounting position of each diaphragm blade can be set without much difficulty. Further, if the operation of the first diaphragm blade is prevented by the second diaphragm blade when the two diaphragm blades are moved away from the exposure aperture portion, and if the operation of the second diaphragm blade is prevented by the first diaphragm blade when the two diaphragm blades move to the exposure aperture portion, it becomes easy to determine whether a malfunction has occurred when both of the diaphragm blades are operated.

DESCRIPTION OF THE PREFERRED EMBODIMENTS

Figure 1:
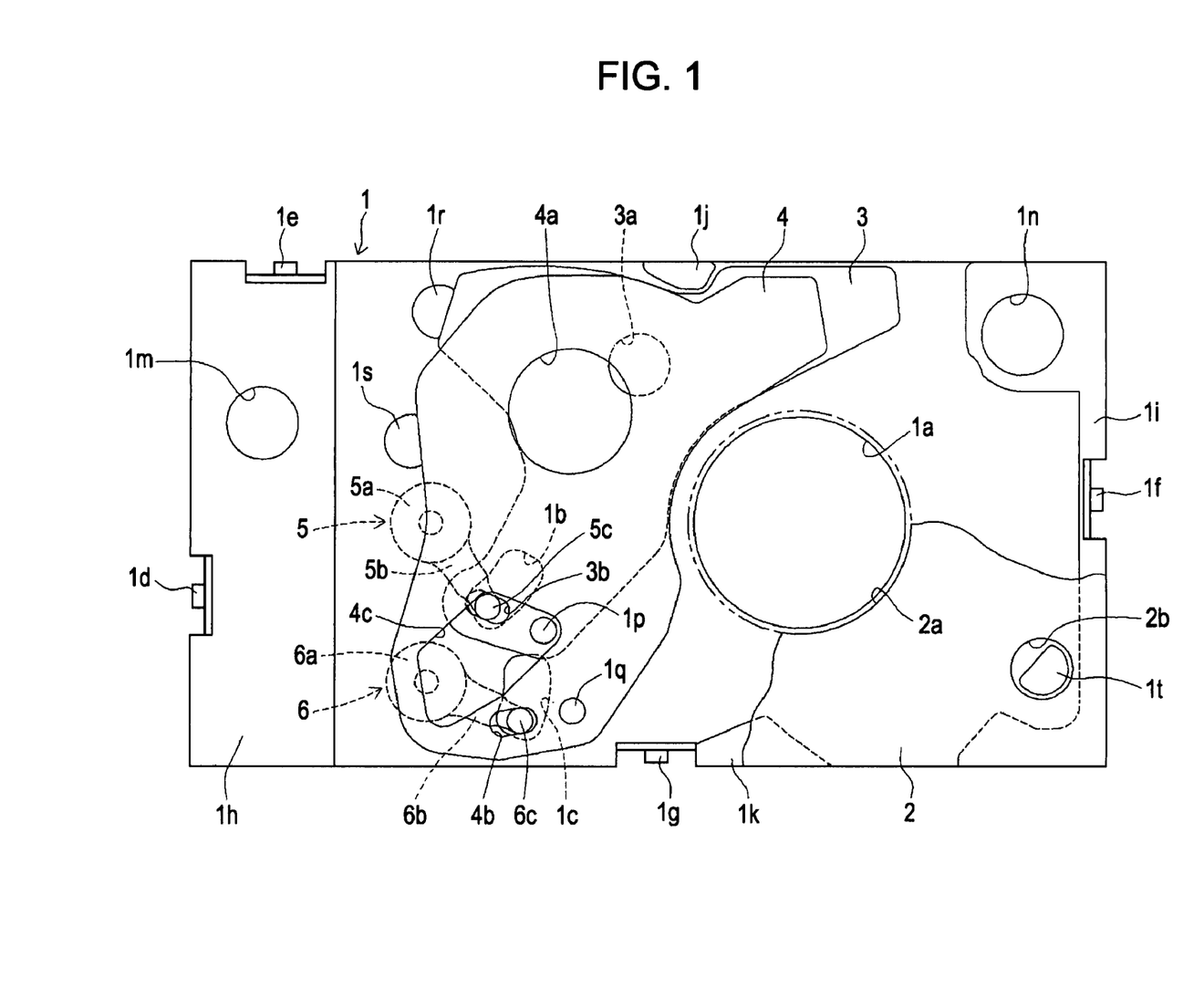
FIG. 1 is a plan view of a maximum diaphragm aperture control state according to a first embodiment of the present invention.
Figure 2:
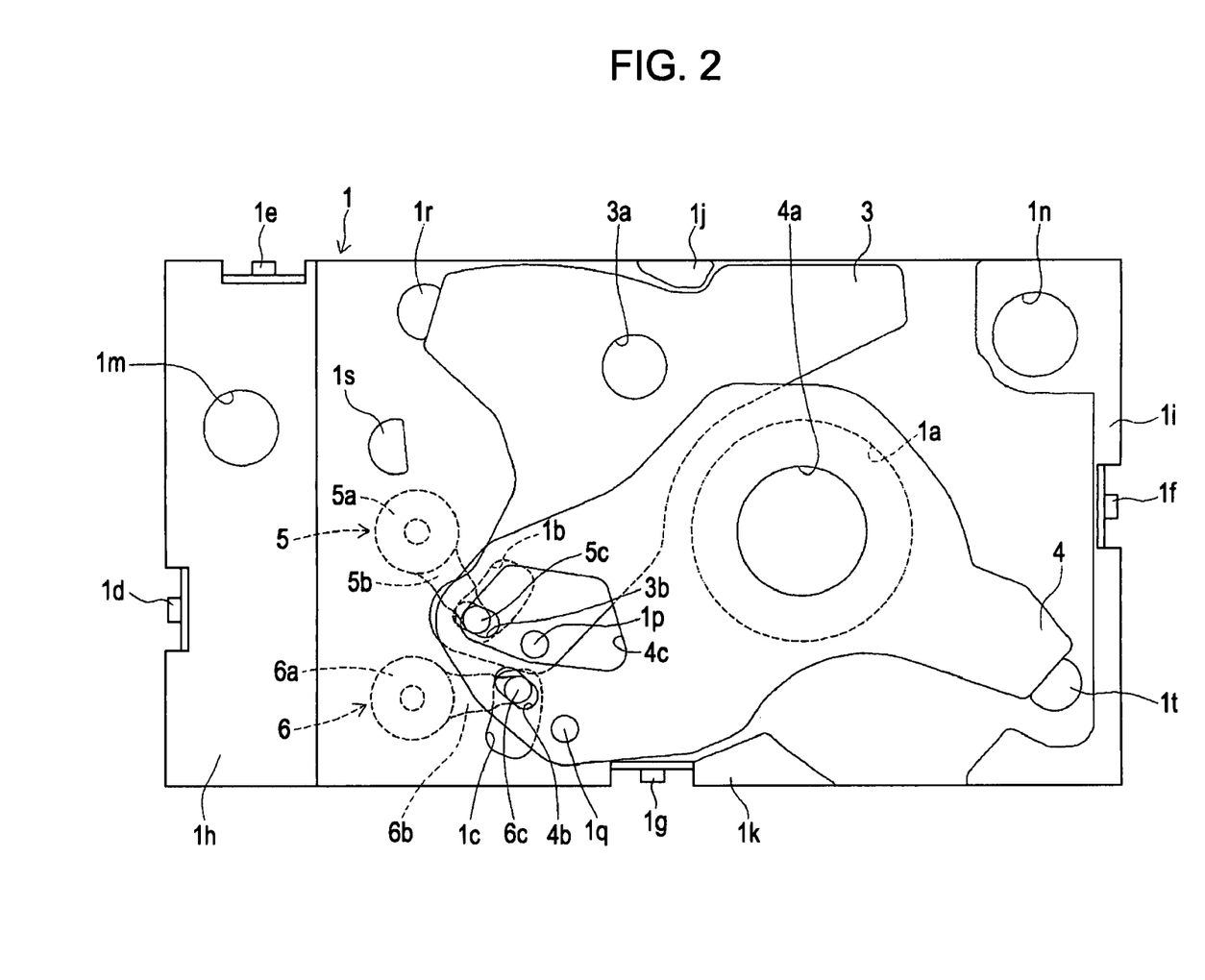
FIG. 2 is a plan view of an intermediate diaphragm aperture control state according to the first embodiment of the present invention.
Figure 3:
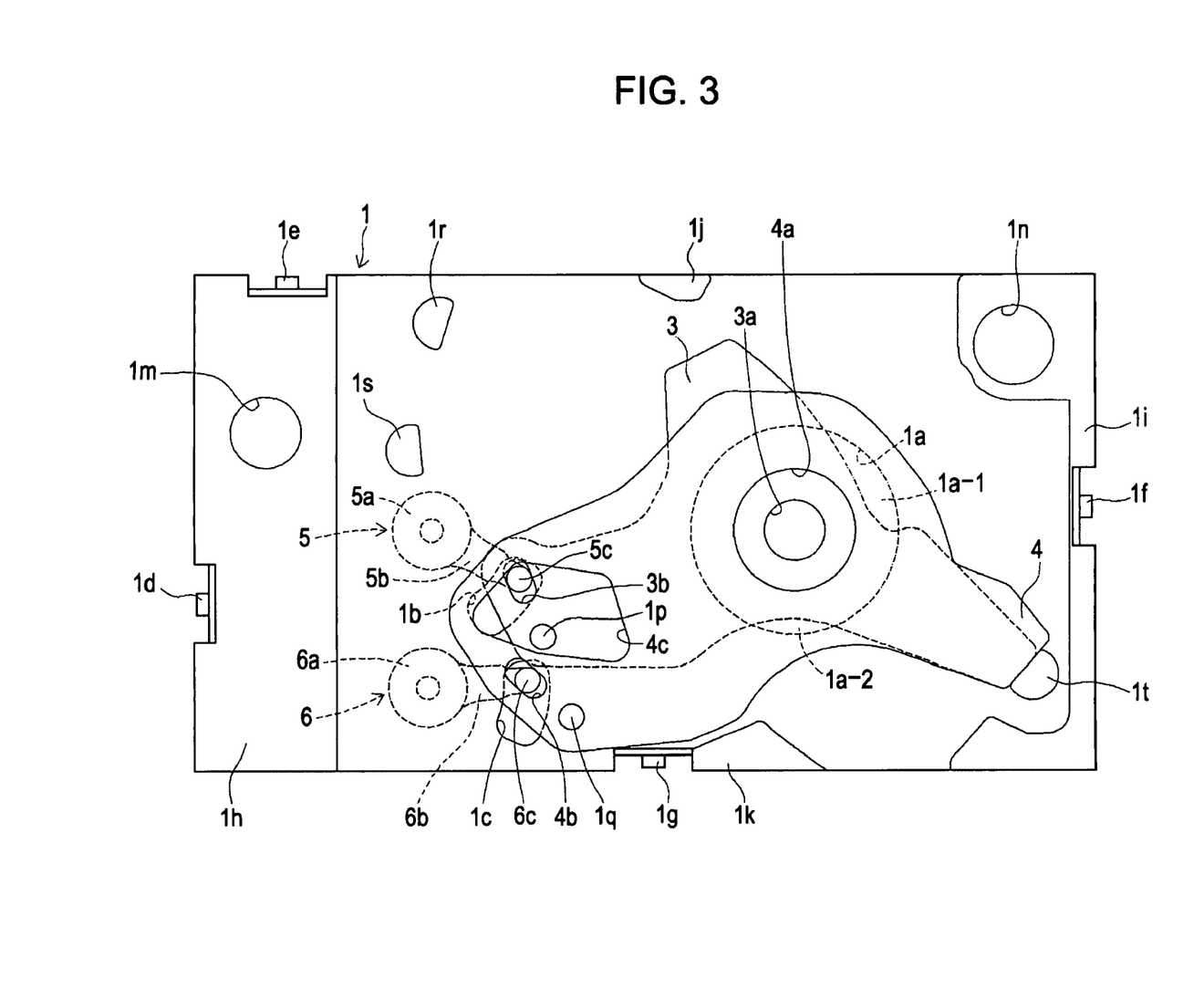
FIG. 3 is a plan view of a minimum diaphragm aperture control state according to the first embodiment of the present invention.
Figure 4:
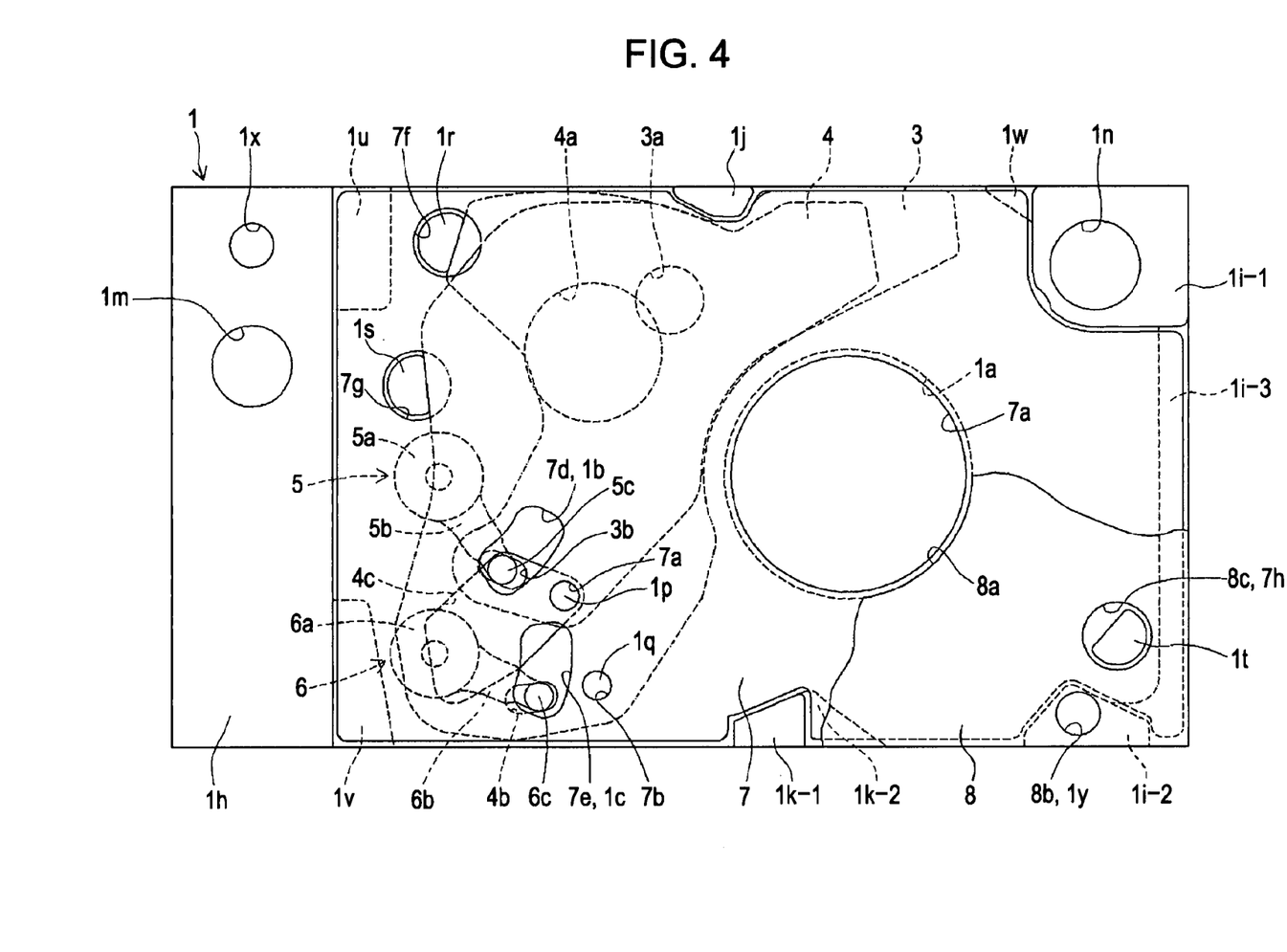
FIG. 4 is a plan view of a maximum diaphragm aperture control state according to a second embodiment of the present invention.

Two illustrated embodiments of the present invention will be described. FIGS. 1 to 3 illustrate a first embodiment, and FIG. 4 illustrates a second embodiment.

First Embodiment

The first embodiment will be described with reference to FIGS. 1 to 3. FIG. 1 is a plan view of a maximum diaphragm aperture control state. FIG. 2 is a plan view of an intermediate diaphragm aperture control state. FIG. 3 is a plan view of a minimum diaphragm aperture control state.

First, the structure according to the embodiment will be described primarily with reference to FIG. 1. A base plate 1 according to the embodiment is formed of synthetic resin, and its planar external shape is substantially rectangular. The base plate 1 has a circular aperture portion 1a having an optical axis as center and two arc-shaped long holes 1b and 1c. Protrusions 1d, 1e, 1f, and 1g are formed at outer wall surfaces at four sides of the base plate 1. Further, large receiving portions 1h and 1i are formed along the left side and the right side of the base plate 1, and small receiving portions 1j and 1k are formed at substantially central portions of the upper and lower sides of the base plate 1, respectively. These four receiving portions 1h, 1i, 1j, and 1k have the same height, and are formed so that their top portions at the front side in FIG.

1 are flush with each other. The receiving portions 1h and 1i have respective mounting holes 1m and 1n for mounting the base plate 1 to a camera.

A thin metallic auxiliary plate 2 is mounted to the base plate 1. A blade chamber is formed between the auxiliary plate 2 and the base plate 1. For easier understanding of the structure of the interior of the blade chamber, only a portion of the auxiliary plate 2 is shown. The auxiliary plate 2 has a shape approximating to a rectangular shape having a size that is substantially the same as that of the base plate 1. The auxiliary plate 2 is made to contact the top surfaces of the four receiving portions 1h, 1i, 1j, and 1k, and a bent hook portion formed at a portion of each side of the auxiliary plate 2 is caught by each of the corresponding protrusions 1d, 1e, 1f, and 1g, to mount the auxiliary plate 2 to the base plate 1. Holes similar to the holes 1m and 1n of the base plate 1 are formed at portions of the auxiliary plate 2 that overlap the holes 1m and 1n of the base plate 1.

A circular aperture portion 2a having an optical axis as center is also formed in the auxiliary plate 2. A portion of the aperture portion 2a is indicated by an alternate long and two short dash line. In the embodiment, the diameter of the aperture portion 2a is greater than the diameter of the aperture portion 1a of the base plate 1. Therefore, the aperture portion 1a is an exposure aperture portion that restricts a maximum diaphragm aperture. However, the diameter of the aperture portion 2a may be made smaller and formed as the exposure aperture portion. The auxiliary plate 2 has a plurality of holes (not shown and described later) in addition to an illustrated hole 2b.

Two blade mounting shafts 1p and 1q, which are positioned close to each other, are provided in a standing manner at a blade-chamber-side surface of the base plate 1. Ends of the respective blade mounting shafts 1p and 1q are inserted into holes (not shown) formed in the auxiliary plate 2. Three stoppers 1r, 1s, and 1t are provided in a standing manner at the blade-chamber-side surface of the base plate 1, of which an end of the stopper 1t is inserted in the hole 2b of the auxiliary plate 2, and an end of each of the other two stoppers 1r and 1s is inserted in a corresponding hole (not shown) formed in the auxiliary plate 2.

Two diaphragm blades 3 and 4 are disposed in the blade chamber. Of these, the diaphragm blade 3, disposed at the bottom plate 1 side, has a circular aperture portion 3a (which restricts a minimum diaphragm aperture) and a long hole 3b. The diaphragm blade 3 is rotatably mounted to the aforementioned blade mounting shaft 1p. The diaphragm blade 4, disposed at the auxiliary plate 2 side, has a circular aperture portion 4a (which restricts an intermediate diaphragm aperture) and a long hole 4a. In order to prevent structural and operational problems, the diaphragm blade 4 also has a relief hole 4c formed so as to avoid the aforementioned blade mounting shaft 1p and a driving pin 5c (described below). The diaphragm blade 4 is rotatably mounted to the aforementioned blade mounting shaft 1q.

Two motors essentially having the same structure are mounted to a surface outside the blade chamber at the base plate 1, that is, at the back-surface side of the base plate 1 in FIG. 1. These motors are well-known current control motors discussed in, for example, Patent Document 1 and Japanese Unexamined Patent Application Publication No. 2005-283877. Each of the motors is one in which a rotor rotates in a direction corresponding to a current supplying direction with respect to a stator coil and only within a predetermined angular range. Since this type of motor is all too well known, its mounting structure to the base plate 1 will not be described. In FIG. 1, only rotors 5 and 6 of the motors are shown.

The rotor 5 of one of the motors includes a body portion 5a (formed of a permanent magnet), an arm portion 5b (integrally formed with the body portion 5a and formed of synthetic resin), and a driving pin 5c (formed at an end of the arm portion 5b). The driving pin 5c is inserted into the aforementioned arc-shaped long hole 1b. In the blade chamber, the driving pin 5c is inserted into the long hole 3b of the diaphragm blade 3 and the relief hole 4c of the diaphragm blade 4, with an end of the driving pin 5c being inserted into an arc-shaped long hole (not shown) formed in the auxiliary plate 2 and having a shape that is the same as that of the long hole 1b.

The rotor 6 of the other motor also includes a body portion 6a (formed of a permanent magnet), an arm portion 6b (integrally formed with the body portion 6a and formed of synthetic resin), and a driving pin 6c (formed at an end of the arm portion 6b). The driving pin 6c is inserted into the arc-shaped long hole 1c. In the blade chamber, the driving pin 6c is inserted into the long hole 4b of the diaphragm blade 4, with an end of the driving pin 6c being inserted into an arc-shaped long hole (not shown) formed in the auxiliary plate 2 and having a shape that is the same as that of the long hole 1c.

Next, the operation according to the embodiment will be described with reference to FIGS. 1 to 3. In FIGS. 2 and 3, the auxiliary plate 2 is not shown. FIG. 1 is a plan view of a shooting standby state in which a power supply switch of a camera is turned on. At this time, the diaphragm blades 3 and 4 are both moved away from the aperture portion 1a, so that the aperture portion 1a is in a fully open state. That is, the diaphragm device is in a maximum diaphragm aperture control state. For this reason, when a release button of the camera is pressed, if a photometer determines that the brightness of object light is less than a standard brightness range, electric current is not supplied to the stator coils of the two motors, and the shooting is performed in the state shown in FIG. 1. Even after the shooting, the next shooting is also performed in the state shown in FIG. 1.

When the release button of the camera is pressed, if the photometer determines that the brightness of the object light is within the standard brightness range, electrical current is supplied to the stator coil of the motor including the rotor 6 in the state shown in FIG. 1. For this reason, the motor 6 is rotated counterclockwise. The driving pin 6c causes the diaphragm blade 4 to rotate clockwise and to move to the aperture portion 1a. Then, the rotation of the rotor 6 and the rotation of the diaphragm blade 4 are stopped by bringing the diaphragm blade 4 into contact with the stopper 1t. FIG. 2 shows a stopped state thereof, and the shooting is performed in this state.

When the shooting ends, electrical current that is in a direction opposite to that of the above is supplied to the stator coil of the motor. Therefore, in FIG. 2, the rotor 6 is rotated clockwise, and the driving pin 6c causes the diaphragm blade 4 to rotate counterclockwise, and to move away from the aperture portion 1a. Then, the rotation of the rotor 6 and the rotation of the diaphragm blade 4 are stopped by bringing the diaphragm blade 4 into contact with the stopper 1s. Thereafter, when the supply of electrical current to the stator coil is stopped, the diaphragm device is restored to the shooting standby state shown in FIG. 1.

Here, why the two rotors 5 and 6 are disposed close to each other in the embodiment will be explained. As can be known from the description in, for example, Patent Document 1, the motors according to the embodiment are mounted so as to partially protrude from the surface outside the blade chamber at the bottom plate 1. Therefore, with the mounting position of the motor including the rotor 6 being maintained, if the mounting position of the motor including the rotor 5 is moved to an upper left position, the efficiency with which a space in the camera at a left area of the bottom plate 1 is used is considerably reduced in terms of camera design. Therefore, in the embodiment, the two motors are disposed close to each other at the lower left area of the bottom plate 1. Consequently, operating areas of the two driving pins 3c and 4c, and the positions of the blade mounting shafts 1p and 1q at the two diaphragm blades 3 and 4 are also inevitably close to each other.

Accordingly, regardless of the operating areas of the two driving pins 3c and 4c being close to each other and the blade mounting shafts 1p and 1q at the two diaphragm blades 3 and 4 being close to each other, in the embodiment, the diaphragm blade 4 does not interfere with the blade mounting shaft 1p and the driving pin 5c when the diaphragm blade 4 reciprocatingly operates as mentioned above due to the relief hole 4c formed in the diaphragm blade 4. Although, in the embodiment, the relief hole 4c is formed in the diaphragm blade 4, it is possible to form the external shape of the diaphragm blade 4 so as to prevent the diaphragm blade 4 from interfering with the blade mounting shaft 1p and the driving pin 5c without forming the relief hole 4c. However, the operation of the diaphragm device is stable when, as in the embodiment of the present invention, the diaphragm blade 4 has the relief hole 4c.

When the release button of the camera is pressed, if the photometer determines that the brightness of the object light is greater than the standard brightness range, electrical current is simultaneously supplied to the stator coils of both of the motors. For this reason, the rotors 5 and 6 are rotated counterclockwise. The driving pins 5c and 6c cause the diaphragm blades 3 and 4 to rotate clockwise and to move to the aperture portion 1a. Then, the rotations of the rotors 5 and 6 and the rotations of the diaphragm blades 3 and 4 are stopped by bringing the diaphragm blades 3 and 4 into contact with the stopper 1t. FIG. 3 shows a stopped state thereof, and shooting is performed in this state.

Here, why both diaphragm blades 3 and 4 are made to move to the aperture portion 1a instead of only the diaphragm blade 3 when the photometer determines that the brightness of the object light exceeds the standard brightness range will be explained. In the embodiment, the external shape of the base plate 1 is determined in terms of camera design. In addition, the positions where the two blade mounting shafts 1p and 1q are provided in a standing manner are restricted by the mounting positions of the motors, and, thus, need to be positioned at predetermined areas. Further, since the base plate 1 and the auxiliary plate 2 are rectangular, and the auxiliary plate 2 is a thin plate member, the receiving portions 1j and 1k of the auxiliary plate 2 are provided near substantially the middle of the long sides of the base plate 1. Therefore, as can be seen from FIG. 1, the two diaphragm blades 3 and 4 are formed with shapes that allow them to avoid the receiving portion 1j.

However, since the diaphragm blades 3 and 4 need to have such shapes, as can be seen from FIG. 3, an area 1a-1 (situated at a portion of the upper right portion of the aperture portion 1a) and an area 1a-2 (situated at a portion of a lower portion of the aperture portion 1a) cannot be covered by only the diaphragm blade 3. Therefore, in the embodiment, the diaphragm blade 4 is also made to move to the aperture portion 1a, so that the areas 1a-1 and 1a-2 that cannot be covered by only the diaphragm blade 3, are covered.

When the shooting in the state shown in FIG. 3 ends in this way, electrical current that is in a direction opposite to that of the above is supplied to the stator coils of the two motors. Therefore, the rotors 5 and 6 are rotated clockwise, and the driving pins 5c and 6c cause the diaphragm blades 4 and 5 to rotate counterclockwise, and to move away from the aperture portion 1a. Then, the rotation of the rotor 5 and the rotation of the rotor 6 are stopped by bringing the diaphragm blades 3 and 4 into contact with the stoppers 1r and 1s. Thereafter, when the supply of electrical current to the two stator coils is stopped, the diaphragm device is restored to the shooting standby state shown in FIG. 1.

In the embodiment in which such an operation is performed, the diaphragm device is formed so that, when the diaphragm blades 3 and 4 malfunction, it is easy to determine that the malfunction has occurred. That is, when, in performing the shooting in the state shown in FIG. 1, either one or both of the diaphragm blades 3 and 4 malfunction, and move to the aperture portion 1a, a ratio between the area of the aperture portion 1a and the area of the aperture portion 3a or a ratio between the area of the opening 1a and the area of the aperture portion 4a is large, so that the brightnesses differ considerably. Therefore, it is easy to determine that the malfunction has occurred.

When, in performing the shooting in the state shown in FIG. 2, the diaphragm blade 4 does not operate, the ratio between the area of the aperture portion 1a and the area of the aperture portion 4a is large, so that the brightnesses differ considerably. Therefore, it is easy to determine that a malfunction has occurred. In addition, even when the diaphragm blade 3 operates along with the diaphragm blade 4, the ratio between the area of the aperture portion 3a and the area of the aperture portion 4a is large, so that the brightnesses differ considerably. Therefore, it is easy to determine that a malfunction has occurred.

However, when the diaphragm blade 4 does not operate and the diaphragm blade 3 operates, the object light not only enters the aperture portion 3a, but also, as shown in FIG. 3, enters the two areas 1a-1 and 1a-2, which can no longer be covered due to the small size of the external shape of the diaphragm blade 3. Therefore, a ratio between the total area of these two areas 1a-1 and 1a-2 and the area of the aperture portion 4a is small, as a result of which the difference between the brightnesses is small. Therefore, it becomes difficult to determine that a malfunction has occurred. Consequently, in this case, when the diaphragm blade 4 does not move to the aperture portion 1a, the diaphragm blade 3 is set so as to be incapable of moving to the aperture portion 1a.

Further, when, in performing the shooting in the state shown in FIG. 3, both of the diaphragm blades 3 and 4 do not operate, the ratio between the area of the aperture portion 1a and the area of the aperture portion 3a is large, so that the brightnesses differ considerably. Therefore, it is easy to determine that a malfunction has occurred. In addition, even when the diaphragm blade 4 operates and the diaphragm 3 does not operate, the ratio between the area of the aperture portion 3a and the area of the aperture portion 4a is large, so that the brightnesses differ considerably. Therefore, it is easy to determine that a malfunction has occurred.

However, when the diaphragm blade 4 does not operate and the diaphragm blade 3 only operates, a ratio between the area of the aperture portion 3a alone and the total area of these two areas 1a-1 and 1a-2, which can no longer be covered due to the small size of the external shape of the diaphragm blade 3, is small, so that the difference between the brightnesses is small. Therefore, it becomes difficult to determine that a malfunction has occurred. Consequently, in this case, when the diaphragm blade 4 does not move to the aperture portion 1a, the diaphragm blade 3 is set so as to be incapable of moving to the aperture portion 1a.

Accordingly, in the embodiment, for the two cases in which it is difficult to determine whether a malfunction has occurred, all malfunctions can be properly determined by preventing the diaphragm blade 3 from moving to the aperture portion 1a. That is, when, in performing the shooting in the state shown in FIG. 2, the diaphragm blade 4 does not operate from the state shown in FIG. 1, the diaphragm blade 3 is prevented from rotating clockwise by preventing the rotation of the rotor 5 by bringing the driving pin 5c into contact with an edge of the relief hole 4c of the diaphragm blade 4. In addition, when, in performing the shooting in the state shown in FIG. 3, the diaphragm blade 4 does not operate from the state shown in FIG. 1, the diaphragm blade 3 is prevented from rotating clockwise by preventing the rotation of the rotor 5 by bringing the driving pin 5c into contact with the edge of the relief hole 4c of the diaphragm blade 4. Therefore, in the embodiment, even for these two cases, it is easy to determine that a malfunction has occurred.

In the embodiment, in these two cases, in order to prevent the diaphragm blade 3 from rotating clockwise, the driving pin 5c of the rotor 5 is brought into contact with the edge of the relief hole 4c of the diaphragm blade 4. However, the same result can be obtained by bringing an engaging pin (which is provided at the aperture blade 3 and which always exists in the relief hole 4c) into contact with the edge of the relief hole 4c of the diaphragm blade 4. In addition, the same result can be obtained by bringing an engaging pin (provided near a portion of the diaphragm blade 3 that contacts the stopper 1r) with an external shape edge of the diaphragm blade 4 in FIG. 1.

Although the explanation of the operation according to the embodiment assumes that the state shown in FIG. 1 is the shooting standby state, the state shown in FIG. 3 may be the shooting standby state depending upon the camera specification. The operations in this case can be easily understood from the aforementioned description of the operations, so that they will not be described in detail. Even if the diaphragm device is operated in this way, as long as the diaphragm blade 3 is in the state shown in FIG. 3, the diaphragm blade 4 is prevented from rotating counterclockwise when the edge of the relief hole 4c comes into contact with the driving pin 5c of the rotor 5. Therefore, a state in which only the diaphragm blade 4 moves away from the aperture portion 1a due to, for example, external shock or vibration does not occur, so that any malfunction can be easily determined as being a malfunction. The determination of such a malfunction may be performed only at the manufacturing stage, or can be recognized by a shooter at any stage of use.

Second Embodiment

Next, a second embodiment of the present invention will be described with reference to FIG. 4. Although, in the first embodiment, the aperture portion 1a of the base plate 1 serves as the exposure aperture portion, as mentioned above in describing the first embodiment, it is known that the aperture portion 2a of the auxiliary plate 2 may also serve as the exposure aperture portion. The second embodiment is an embodiment of such a structure. FIG. 4 is a plan view of a maximum diaphragm aperture control state according to the second embodiment.

It is known that, depending upon the camera specification, the edge of the aperture portion serving as the exposure aperture portion is made as thin as possible. This is to, for example, minimize light that is reflected by a end face of the aperture portion and that reaches an image pickup element, or to dispose the diaphragm blades close to a lens in a camera. From such viewpoints, as mentioned above, it is desirable that the opening 2a of the auxiliary plate 2 formed of a thin material serve as the exposure aperture portion.

However, although it is possible to reduce the thickness of the auxiliary plate 2 to the thicknesses of the diaphragm blades 3 and 4, reducing the thickness makes it correspondingly easier for the auxiliary plate 2 to become deformed. Therefore, it becomes necessary to take various measures to prevent it from becoming deformed when the diaphragm device is transported or when it is being assembled in a camera. Therefore, in the embodiment, as described above, not only is the aperture portion 2a of the auxiliary plate 2 made to serve as the exposure aperture portion, but also various measures are taken to prevent the thin auxiliary plate 2 from becoming deformed.

Although a specific structure according to the second embodiment will be described, the second embodiment is rather a modification of the first embodiment. Therefore, in FIG. 4, members or portions that are essentially the same as those according to the first embodiment will be given the same reference numerals. The members or portions that are exactly the same as those according to the first embodiment will not be described below. The members or portions having structural features that differ from those in the first embodiment will only be described.

A bottom plate 1 according to the embodiment does not have the four protrusions 1d, 1e, 1f, and 1g provided at the outer wall surfaces of the base plate 1 according to the first embodiment. In addition, the receiving portion 1i in the first embodiment is divided into three receiving portions 1i-1, 1i-2, and 1i-3. The middle receiving portion 1i-3 is formed so as to be lower than the receiving portions 1i-1 and 1i-2 formed on respective sides of the receiving portion 1i-3 in a vertical direction. In addition, the receiving portion 1k according to the first embodiment is also divided into two receiving portions, a left receiving portion 1k-1 and a right receiving portion 1k-2. The height of the left receiving portion 1k-1 is the same as that of the receiving portion 1k in the first embodiment, whereas the right receiving portion 1k-2 is one step lower than the receiving portion 1k in the first embodiment. Further, three receiving portions 1u, 1v, and 1w are also formed so that their heights are the same as those of the receiving portions 1i-3 and 1k-2. The receiving portions 1h and 1i-1 have a hole 1x and a hole 1y, respectively.

The lengths of the left and right sides of the external shape of an auxiliary plate 7 according to the embodiment are smaller than those of the auxiliary plate 2 according to the first embodiment. However, like the auxiliary plate 2 according to the first embodiment, the auxiliary plate 7 is formed so as to be thin. In addition, the auxiliary plate 7 is brought into contact with the aforementioned receiving portions 1i-3, 1k-2, 1u, 1v, and 1w by fitting holes 7a and 7b onto blade mounting shafts 1p and 1q of the base plate 1, and a blade chamber of diaphragm blades 3 and 4 is formed between the auxiliary plate 7 and the base plate 1. A circular aperture portion 7c having an optical axis as center is also formed in the auxiliary plate 7. The diameter of the aperture portion 7c is smaller than the diameter of the aperture portion 1a of the base plate 1.

The auxiliary plate 7 has long holes 7d and 7e having the same shape at portions thereof opposing the long holes 1b and 1c of the base plate 1. Driving pins 5c and 6c of respective rotors 5 and 6 are inserted into the long holes 7d and 7e, respectively. The auxiliary plate 7 also has three holes 7f, 7g, and 7h that receive stoppers 1r, 1s, and 1t, respectively.

In the embodiment, a protective plate 8 is further mounted to the base plate 1. Due to the aforementioned reason, the protective plate 8 is formed so as to be thicker than the auxiliary plate 7. The protective plate 8 has an aperture portion 8a formed around an optical axis as center and having the same diameter as the aperture portion 1a. The external shape of the protective plate 8 is substantially the same as that of the auxiliary plate 2 according to the first embodiment. In FIG. 4, only a portion of a lower right portion of the protective cover 8 is shown as with the auxiliary plate 2 shown in FIG. 1. The protective plate 8 is brought into contact with the receiving portions 1h, 1i, 1k-1, 1i-1, and 1i-2. By two screws (not shown), the protective plate 8 is mounted to the two holes 1x and 1y of the base plate 1. The auxiliary plate 7 is pushed against the receiving portions 1i-3, 1k-2, 1u, 1v, and 1w by protrusions (not shown).

Therefore, the protective plate 8 naturally has holes formed in correspondence with the holes 1x and 1y. Of these holes, a hole 8b is only shown in FIG. 4. The protective plate 8 also has holes having substantially the same shape and formed in correspondence with holes 1m and 1n of the base plate 1, and holes having substantially the same shapes and formed in correspondence with the holes 7a, 7b, 7f, 7g, and 7h of the auxiliary plate 7. The protective plate 8 also has long holes having substantially the same shape and formed in correspondence with the long holes 7d and 7e of the auxiliary plate 7. In FIG. 4, of these holes, a hole 8c formed in correspondence with the hole 7h of the auxiliary plate 7 is only shown.

The other structural features are exactly the same as those of the first embodiment. Therefore, what has been described about the structural features in the section describing the first embodiment also applies to the second embodiment. The structure according to this embodiment is as described above. The operation according to the embodiment is substantially the same as that according to the first embodiment. To avoid repetition, the operation will not be described.

Third Embodiment

Figure 5:
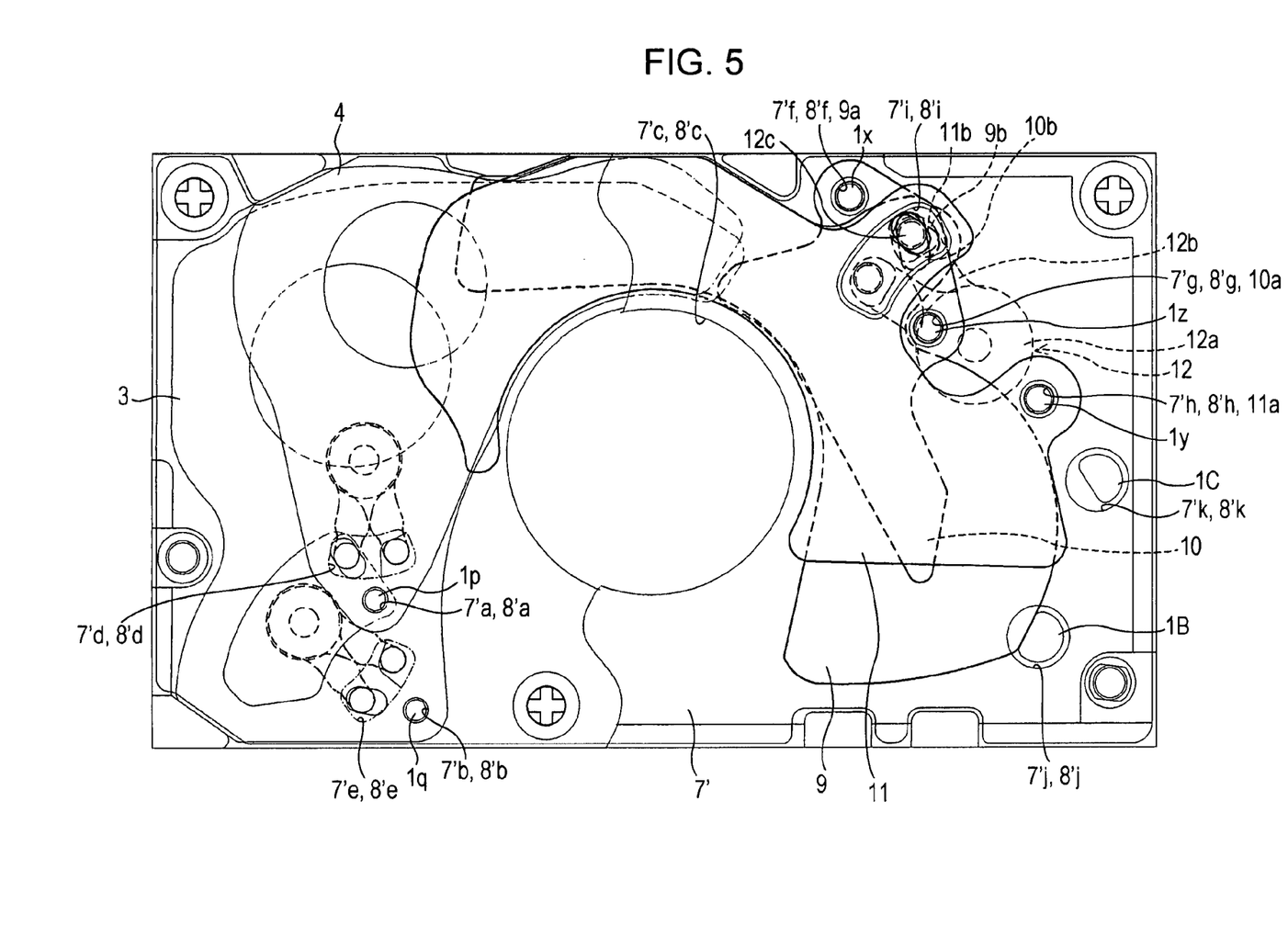
FIG. 5 is a plan view of a maximum diaphragm aperture state according to a third embodiment of the present invention.

A third embodiment shown in FIG. 5 will be described.

Although, in each of the first and second embodiments, the diaphragm device is a device only including diaphragm blades, the present invention is applicable to a diaphragm device (shutter device) including shutter blades.

Although a specific structure according to the third embodiment will be described, the third embodiment is rather a modification of the first and second embodiments. Therefore, in FIG. 5, members or portions that are essentially the same as those according to the first and second embodiments will be given the same reference numerals. The members or portions that are exactly the same as those according to the first and second embodiments will not be described below.

A base plate 1 according to the third embodiment additionally has blade mounting shafts 1x, 1y, and 1z, to which shutter blades 9, 10, and 11 are mounted, and stoppers 1B and 1C of the shutter blades.

An auxiliary plate 7' and a protective plate 8' are mounted. For indicating the relative positions of diaphragm blades and the shutter blades, a portion of the auxiliary plate 7' (that is, a left-diaphragm-blade side) and the whole protective plate 8' are not shown in FIG. 5.

Like the auxiliary plate 2 according to the first embodiment and the auxiliary plate 7 according to the second embodiment, the auxiliary plate 7' is thin. In addition, the auxiliary plate 7' is such that holes 7'a, 7'b, 7'f, 7'g, and 7'h are fitted onto blade mounting shafts 1p, 1q, 1x, 1y, and 1z of the base plate 1, to form a diaphragm blade chamber for accommodating diaphragm blades 3 and 4 between the auxiliary plate 7' and the base plate 1. Long holes 7'd, 7'e, and 7'i and holes 7'c, 7'j, and 7'k are formed in the auxiliary plate 7'.

The protective plate 8' is mounted to the base plate 1 with three screws so that a shutter blade chamber accommodating the shutter blades 9, 10, and 11 is formed between the auxiliary plate 7' and the protective plate 8'. The protective plate 8' is such that holes 8'a, 8'b, 8'f, 8'g, and 8'h are fitted onto blade mounting shafts 1p, 1q, 1x, 1y, and 1z. The protective plate 8' has long holes 8'd, 8'e, and 8'i, and holes 8'c, 8'i, and 8'j.

The hole 7'c of the auxiliary plate 7' is slightly smaller than the hole 8'c of the protective plate 8', and forms an aperture of an exposure aperture portion.

The shutter blades 9, 10, and 11 have respective holes 9a, 10a, and 11a, and respective long holes 9b, 10b, and 11b. The holes 9a, 10a, and 11a are fitted onto the blade mounting shafts 1x, 1y, and 1z of the base plate 1. A driving pin 12c is inserted into holes 9b, 10b, and 11b. The shutter blade 9 is mounted so as to be rotatable by rotation of a rotor 12 until it contacts a stopper 1B (provided at the base plate 1) at a position where the shutter blades move away from the shutter-blade aperture portion. The shutter blade 10 is mounted so as to be rotatable by the rotation of the rotor 12 until it contacts a stopper 1C (provided at the base plate 1) at a position where the exposure aperture portion is covered by the shutter blades.

According to the above-described structure, the diaphragm blade chamber and the shutter blade chamber are partitioned by the auxiliary plate 7'; the diaphragm blades can rotate and move without colliding with the shutter blades; and the shutter blades can also rotate and move without colliding with the diaphragm blades.

By disposing the diaphragm blade 4 and the shutter blade 11 so that they always slidably contact each other, it is possible to prevent the shutter blade 9 and the diaphragm blade 3 or the diaphragm blade 4 from colliding with each other, and to omit the auxiliary plate 7'. In this case, the aperture of the exposure aperture portion is determined by the base plate 1 or the protective plate 8'.

Therefore, the operations of the diaphragm blades 3 and 4 according to the third embodiment are exactly the same as those according to the first and second embodiments. What has been mentioned regarding the structures thereof is also applicable to the third embodiment.

Although, in the embodiments, the diaphragm blades 3 and 4 have the respective aperture portions 3a and 4a, an ND filter sheet may be mounted to at least one of the diaphragm blades 3 and 4 so as to cover the aperture portion 3a or 4a. In addition, although, in the embodiments, well-known current control motors discussed in, for example, Patent Document 1 are used as driving means, the driving means according to the present invention are not limited to motors having such a structure. Current control motors having other structures or stepping motors may also be used.

Although the structures according to the embodiments are such that the diaphragm device is mounted to a camera as a unit, the camera diaphragm device according to the present invention may be such that its structural members are successively mounted to the camera. Although, in the embodiments, the diaphragm device alone is formed as a unit, the camera diaphragm device according to the present invention may be formed as a unit along with a shutter device. When the diaphragm device is formed in this way, for example, one more diaphragm chamber may be formed between the auxiliary plate 7 and the protective plate 8 according to the second embodiment, and shutter blades may be formed in the diaphragm chamber.

What is claimed is:

1. A camera diaphragm device comprising:
    a base plate having an aperture portion in which an optical axis serves as center;
    an auxiliary plate having an aperture portion in which an optical axis serves as center, a blade chamber being formed between the auxiliary plate and the base plate, either the aperture portion of the auxiliary plate or the aperture portion of the base plate serving as an exposure aperture portion that restricts a maximum diaphragm aperture;
    a first diaphragm blade having a diaphragm aperture portion which restricts a minimum diaphragm aperture, the first diaphragm blade being mounted to the base plate so that, by a driving pin of first driving means, the first diaphragm blade is reciprocatingly rotated to move to and away from the exposure aperture portion, the first diaphragm blade having a shape that causes an incapable-of-covering area to exist in addition to an area of the diaphragm aperture portion of the first diaphragm blade when the first diaphragm blade is moved to the exposure aperture portion, the incapable-of-covering area being where a portion of the exposure aperture portion is incapable of being covered; and
    a second diaphragm blade having a diaphragm aperture portion which restricts an intermediate diaphragm aperture, the second diaphragm blade being mounted to the base plate at a position near where the first diaphragm blade is mounted so that, by a driving pin of second driving means, the second diaphragm blade is reciprocatingly rotated to move to and away from the exposure aperture portion from substantially a same direction as the first diaphragm blade, the second diaphragm blade having a shape causing the second diaphragm blade to cover a whole area of the exposure aperture portion, differing from an area of the diaphragm aperture portion of the second diaphragm blade, when the second diaphragm blade is moved to the exposure aperture portion,
    wherein, when the first diaphragm blade is moved to the exposure aperture portion, the second diaphragm blade is also moved to the exposure aperture portion, so that the second diaphragm blade covers the incapable-of-covering area.

2. The camera diaphragm device according to claim 1, wherein the second diaphragm blade has a relief hole, and wherein the driving pin of the first driving means exists in the relief hole.

3. The camera diaphragm device according to claim 2, wherein the second diaphragm blade has a first engaging portion, which corresponds to a portion of an edge of the relief hole, and a second engaging portion, which corresponds to another portion of the edge,
    wherein the first diaphragm blade has an engaging portion existing in the relief hole,
    wherein, when the second diaphragm blade is in a moved away state from the exposure aperture portion, the first engaging portion of the second diaphragm blade contacts the engaging portion of the first diaphragm blade to prevent the first diaphragm blade from moving to the exposure aperture portion, and
    wherein, when the first diaphragm blade is moved to the exposure aperture portion, the second engaging portion contacts the engaging portion of the first diaphragm blade to prevent the second diaphragm blade from moving away from the exposure aperture portion.

4. The camera diaphragm device according to claim 3, wherein at least one of the first diaphragm blade and the second diaphragm blade has an ND filter sheet mounted thereto so as to cover the diaphragm aperture portion thereof.

5. The camera diaphragm device according to claim 2, wherein the second diaphragm blade has a first engaging portion, which corresponds to a portion of an edge of the relief hole, and a second engaging portion, which corresponds to another portion of the edge,
    wherein, when the second diaphragm blade is in a moved away state from the exposure aperture portion, the driving pin of the first driving means contacts the first engaging portion to prevent the first diaphragm blade from moving to the exposure aperture portion, and
    wherein, when the first diaphragm blade is moved to the exposure aperture portion, the second engaging portion contacts the driving pin of the first driving means to prevent the second diaphragm blade from moving away from the exposure aperture portion.

6. The camera diaphragm device according to claim 5, wherein at least one of the first diaphragm blade and the second diaphragm blade has an ND filter sheet mounted thereto so as to cover the diaphragm aperture portion thereof.

7. The camera diaphragm device according to claim 2, wherein the first diaphragm blade and the second diaphragm blade each have an engaging portion,
    wherein, when the second diaphragm blade is in a moved away state from the exposure aperture portion, the engaging portion of the first diaphragm blade contacts the engaging portion of the second diaphragm blade to prevent the first diaphragm blade from moving to the exposure aperture portion, and
    wherein, when the first diaphragm blade is moved to the exposure aperture portion, the engaging portion of the second diaphragm blade contacts the engaging portion of the first diaphragm blade to prevent the second diaphragm blade from moving away from the exposure aperture portion.

8. The camera diaphragm device according to claim 7, wherein at least one of the first diaphragm blade and the second diaphragm blade has an ND filter sheet mounted thereto so as to cover the diaphragm aperture portion thereof.

9. The camera diaphragm device according to claim 2, wherein at least one of the first diaphragm blade and the second diaphragm blade has an ND filter sheet mounted thereto so as to cover the diaphragm aperture portion thereof.

10. The camera diaphragm device according to claim 1, wherein the first diaphragm blade and the second diaphragm blade each have an engaging portion,
    wherein, when the second diaphragm blade is in a moved away state from the exposure aperture portion, the engaging portion of the first diaphragm blade contacts the engaging portion of the second diaphragm blade to prevent the first diaphragm blade from moving to the exposure aperture portion, and
    wherein, when the first diaphragm blade is moved to the exposure aperture portion, the engaging portion of the second diaphragm blade contacts the engaging portion of the first diaphragm blade to prevent the second diaphragm blade from moving away from the exposure aperture portion.

11. The camera diaphragm device according to claim 1, wherein at least one of the first diaphragm blade and the second diaphragm blade has an ND filter sheet mounted thereto so as to cover the diaphragm aperture portion thereof.

* * * * *